United States Patent [19]
Webster

[11] Patent Number: 5,862,697
[45] Date of Patent: Jan. 26, 1999

[54] TUBE BENDING APPARATUS, AND METHODS OF CONSTRUCTING AND UTILIZING SAME

[76] Inventor: M. Craig Webster, 1505 E. Lake Dr., Novi, Mich. 48377

[21] Appl. No.: 611,396

[22] Filed: Mar. 5, 1996

[51] Int. Cl.$^6$ .............. B21D 7/04; B21B 37/08
[52] U.S. Cl. .............. 72/149; 72/20.1; 72/155
[58] Field of Search .............. 72/149, 150, 155, 72/17.2, 18.3, 19.7, 20.1, 21.4, 20.3

[56] References Cited

U.S. PATENT DOCUMENTS

| | | | |
|---|---|---|---|
| 3,949,582 | 4/1976 | Eaton et al. | 72/150 |
| 4,552,006 | 11/1985 | Yogo | 72/145 |
| 4,760,727 | 8/1988 | Van Landingham | 72/149 |
| 4,970,885 | 11/1990 | Chipp et al. | 72/17.2 |
| 5,301,530 | 4/1994 | Beelen et al. | 72/149 |
| 5,343,725 | 9/1994 | Sabine | 72/155 |

OTHER PUBLICATIONS

DMC–1000 Manual Rev. 1.5, Galil Motion Control, Inc., Rev. 6–95, pp. 1–1 to 1–4, 2–6 to 2–8, 3–24 to3–25, 4–31 to4–32, 5–40 to5–41, 7–84 to 7–85, 10–128 to10–135.

Baldor Motors and Drives 501, Oct. 2, 1995,product list.

Unicase™ Parallel In–Line Helical Gearmotors & Speed Reducers information sheet, ©1989 Nord Gear Corporation.

Clincher™ Helical Gearmotors & Speed Reducers information sheet, ©1990 Nord Gear Corporation.

Unicase™ Helical–Worm Gearmotors & Speed Reducers information sheet, ©1990 Nord Gear Corporation.

*Primary Examiner*—Lowell A. Larson
*Assistant Examiner*—Rodney Butler
*Attorney, Agent, or Firm*—Weiner, Carrier, Burt & Esser, P.C.; William F. Esser; Irving M. Weiner

[57] ABSTRACT

A tube bending apparatus, comprising a tube holding mechanism; a first head member for substantially preventing lateral movement of a first portion of the tube; a unit for translating the tube along its longitudinal axis so as to be substantially adjacent the first head member; a unit for rotating the tube about its longitudinal axis; a bend arm member which is pivotally connected to the first head member; a drive mechanism for rotating the bend arm member so as to contact the tube for bending thereof; and wherein the drive mechanism comprises an electric motor and associated gearing for directly coupling the motor to the bend arm member.

10 Claims, 14 Drawing Sheets

TUBE BENDING APPARATUS, AND METHODS OF CONSTRUCTING AND UTILIZING SAME

BACKGROUND OF THE INVENTION

1. Field of Invention

The invention pertains to a device for bending tubes, and in particular to a machine for programmably bending metal tubes into a variety of shapes.

2. Description of the Relevant Art

There are known devices for bending metal tubes. These machines utilize hydraulic mechanisms or chain driven mechanisms in applying pressure and/or forces to tubing so as to cause bending thereof, and thereby experiences limited accuracy and efficiency.

SUMMARY OF THE INVENTION

The present invention overcomes the above-discussed shortcomings and satisfies a significant need for precisely bending tubular members according to predetermined settings supplied by the user.

According to the present invention, there is provided a tube bending apparatus, comprising a means for feeding a tubular member longitudinally along a first axis; a means for rotating the tubular member about its longitudinal axis; a first head member for slidably contacting a portion of the tubular member; a bending arm which is positioned proximally to the first head member, for selectively rotating a portion of the tubular member about an axis substantially perpendicular to the longitudinal axis of the tubular member, so as to cause the tubular member to bend; means, associated with the bending arm, for rotating the bending arm; means for programmably controlling the bending arm rotating means, tubular member feeding means and tubular member rotating means according to user specifications; and wherein the motion means comprises a vector drive motor and speed reducing gearing. The controlling means preferably but not necessarily comprises a computer and a motion controller.

In use, the user provides data to the controlling means as to the nature and extent of the bending which is to be performed on the tubular member. The data is stored in computer memory. Next, the controlling means generates signals to the drive motor, tubular member feeding means and tubular member rotating means so as to coordinate the feeding of the tubular member relative to the first head member, the rotating of the tubular member and the rotating of the bending arm in bending the tubular member as desired. Feedback is provided to the controlling means from the tubular member feeding and tubular member rotating member as well as the drive motor so as to stabilize the tubular member feeding, rotating and bending.

It is an object of the present invention to provide a tube bending apparatus which accurately works a tubular member according to user supplied specifications.

Another object of the present invention is to provide a tube bending apparatus which bends a tubular member with increased torque so as to effectively work a wide variety of tubular members.

It is another object of the present invention to provide a tube bending apparatus having a bending arm which utilizes increased bending speed and reduced cycling time.

A further object of the present invention is to provide a tube bending apparatus which substantially eliminates backlash of the apparatus bending arm.

Another object of the present invention is to provide a tube bending apparatus which consumes substantially less power than conventional tube bending machines.

Other objects, advantages and salient features of the present invention will become apparent from the following detailed description, which, when taken in conjunction with the annexed drawings, discloses a preferred embodiment of the present invention.

BRIEF DESCRIPTION OF THE PREFERRED EMBODIMENT

DETAILED DESCRIPTION OF THE PREFERRED EMBODIMENT

Referring to FIGS. 1–5, there is shown an apparatus for bending a tubular member according to user supplied specifications, preferably but not necessarily comprising means for feeding a tubular member T along its longitudinal axis; means for rotating the tubular member T about its longitudinal axis; means for providing a support about which the tubular member T is bent; means for bending tubular member T about an axis substantially perpendicular to the longitudinal axis thereof; and means for programmably controlling the bending means, the tubular member feeding means and the tubular member rotating means.

Figure 1:
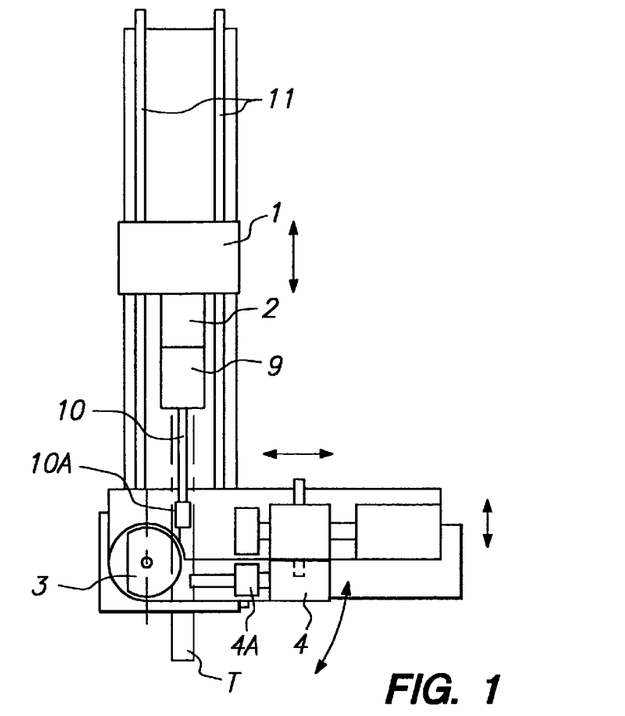
FIG. 1 is a top plan view of a preferred embodiment of the present invention.
Figure 2:
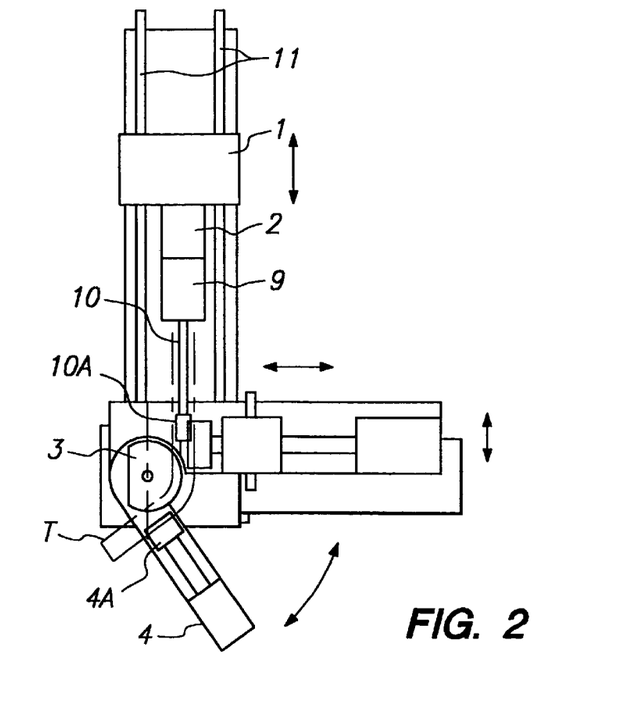
FIG. 2 is a second top plan view of a preferred embodiment of the present invention.

The tubular member feeding means preferably but not necessarily feeds tubular member 1 substantially longitudinally along so as to slidably engage with head member 3. The feeding means includes carriage 2 to which one end of tubular member T is secured; rod 10 having end 10A around which tubular member T is received; and motion means for moving carriage 2 and tubular member T along rails 11 so that a portion of tubular member T slidably engages with head member 3. Rod 10 maintains tubular member T in a substantially stable position relative to head member 3. In a preferred embodiment of the present invention, the motion means of the tubular member feeding means includes a hydraulic cylinder. Alternatively, the tubular member feeding means includes an electric drive motor.

The preferred embodiments of the present invention preferably includes a means for rotating tubular member T. The rotating means of (FIGS. 1 and 2) preferably but not necessarily rotates tubular member T about its longitudinal axis so that the apparatus may repeatingly bend tubular member T at any angle relative to its longitudinal axis as tubular member T is fed to adjacent head member 3. In this way, tubular member T can be sequentially bent so as to form a tube having a plurality of nonplanar tubular segments, with each of the tubular segments being positioned at any desired angle relative to an adjacent tubular segment.

Head member 3 preferably but not necessarily provides a support along which tubular member T slidably engages so that rotational forces applied by the tubular bending means causes tubular member T to rotate thereabout. In this way, head member 3 acts as a fulcrum in bending tubular member T thereabout. As shown in FIG. 2, head member 3 includes a concave surface 3A for substantially conforming to the outer contour of tubular member T.

According to the preferred embodiment of the present invention, the tubular bending means preferably but not necessarily comprises bend arm 4. Bend arm 4 selectively rotates about axis P, which is an axis that passes longitudinally through the center of head member 3. Bend arm 4 preferably but not necessarily includes workpiece engaging member 4A which moves forwardly relative to bend arm 4 as bend arm 4 is rotated about axis P, so as to engage with a portion of tubular member T. Workpiece engaging member 4A preferably but not necessarily includes a substantially concave surface which substantially conforms to the outer contour of tubular member T. As a result, as bend arm 4 is rotated about axis P according to specifications supplied by the user, workpiece engaging member 4A moves forwardly relative to bend arm 4 and eventually contacts a portion of tubular member T which is positioned just forwardly of head member 3 so that tubular member T is bent at said portion as bend arm 4 completes its rotational movement.

Figure 3:
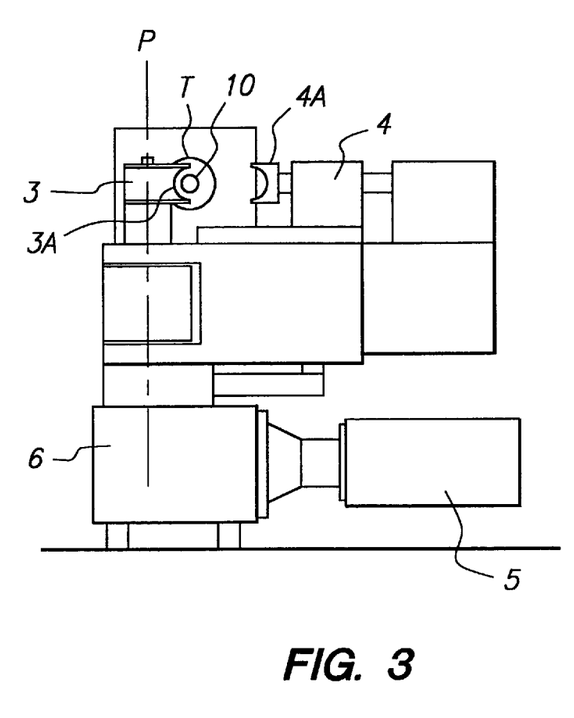
FIG. 3 is a side elevational view of a preferred embodiment of the present invention.

According to a preferred embodiment of the present invention, the means for bending tubular member T further includes a means for rotating bend arm 4 about axis P. As shown in FIG. 3, the bend arm rotating means preferably but not necessarily comprises motor 5 and gearing 6.

Motor 5 is preferably an electric motor, but alternatively motor 5 may comprise another motor type. In a preferred embodiment of the present invention, motor 5 is an AC vector drive motor.

Gearing 6 preferably directly couples motor 5 to the spindle about which bend arm 4 is rotated. In a preferred embodiment of the present invention, gearing 6 provides a fixed gear reduction ratio, but alternatively, gearing 6 can be provided with other gearing ratios.

The bend arm rotation means comprising the combination of AC vector drive motor 5 and gearing 6 provides a number of significant advantages over conventional tube bending machines. For instance, the above-described combination yields at least a 50% increase in bending torque than conventional tube bending machines having hydraulic operated bend arm rotation means. In addition, the tube bending speed is at least 50% faster than the bending speed of conventional hydraulic machines. Further, since drive motor 5 only consumes power when bend arm 4 is actually rotating, the power consumption of the system is substantially less than the power consumption of conventional hydraulic tube bending machines.

Significantly, since motor 5 is directly coupled to the spindle about which bend arm 4 rotates, the tube bending means of the present invention requires no chains, yokes, idlers or high pressure hydraulic mechanisms which typically leak and/or otherwise require frequent maintenance. As a result, the tube bending means of the present invention is substantially maintenance-free and environmentally clean.

Figure 4:
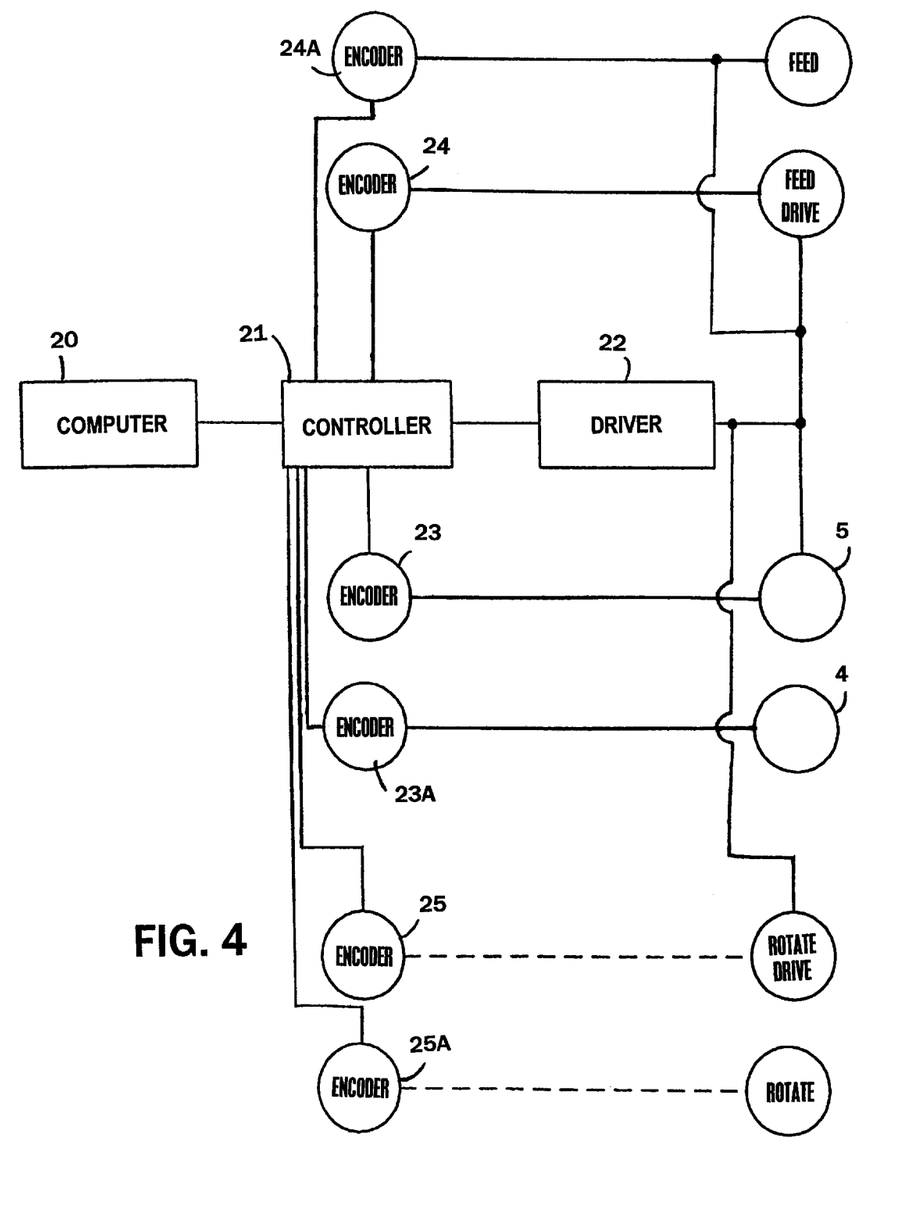
FIG. 4 is a schematic block diagram showing the electronic circuitry of the present invention.
Figure 5A:
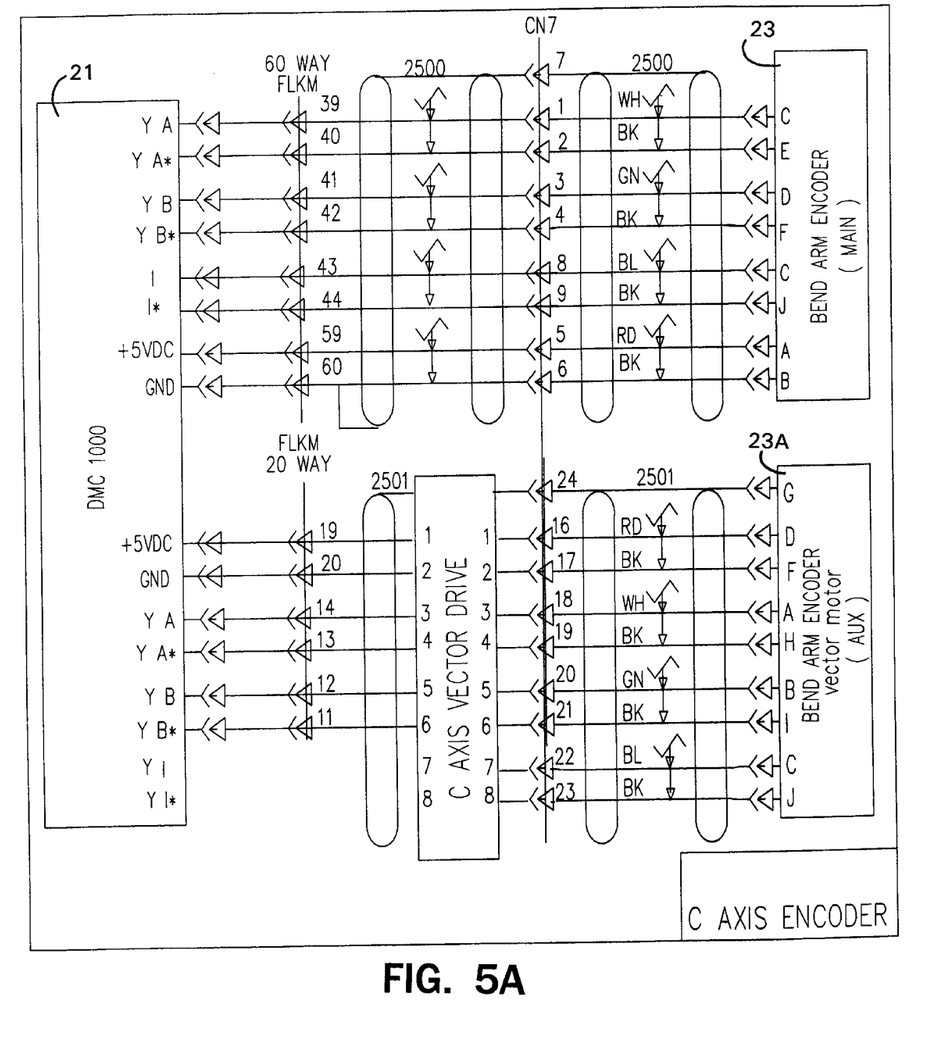
FIGS. 5A–5K are schematics of the electronic circuitry of the present invention.
Figure 5B:
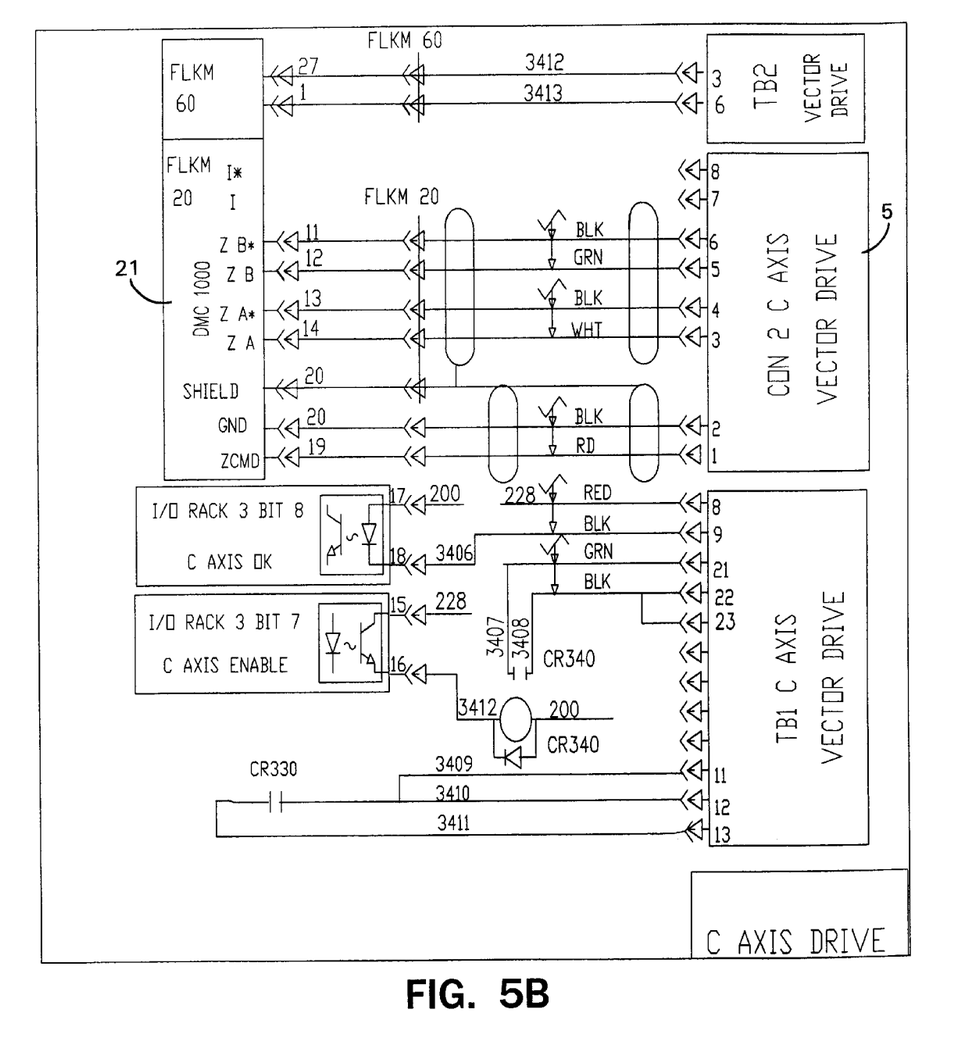
Figure 5C:
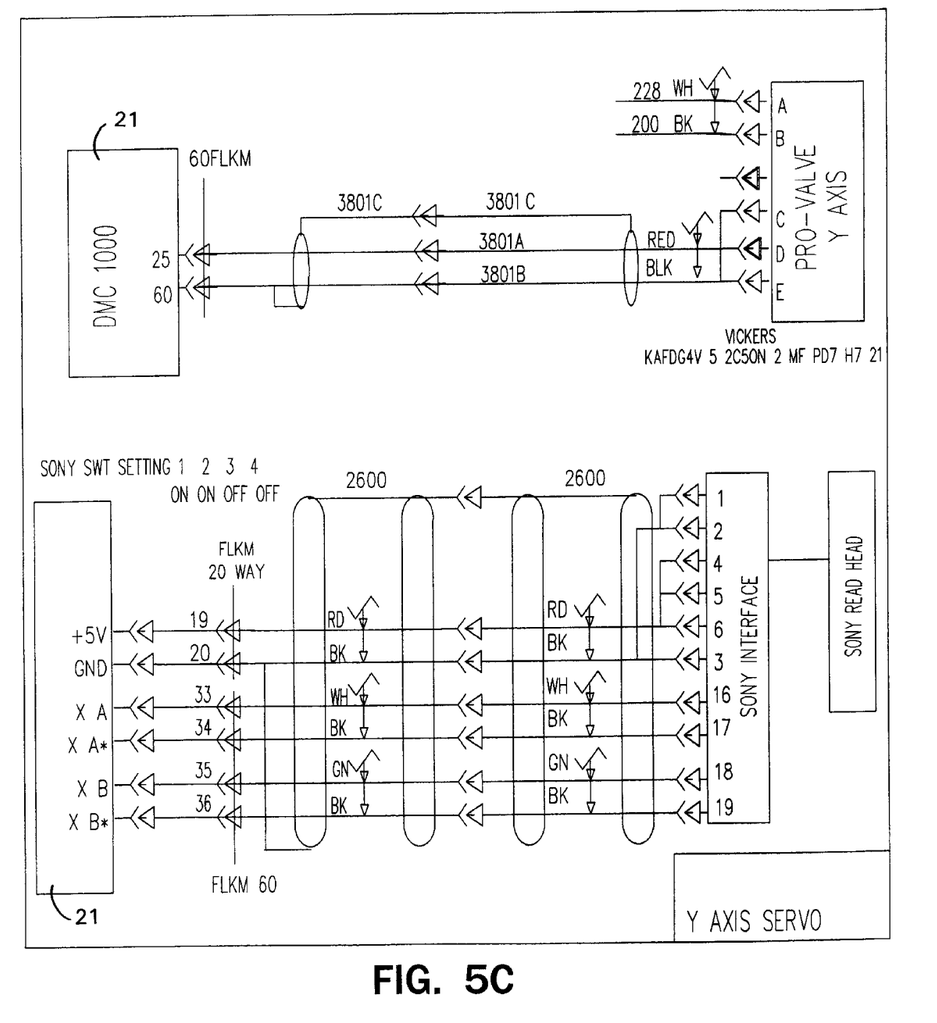
Figure 5D:
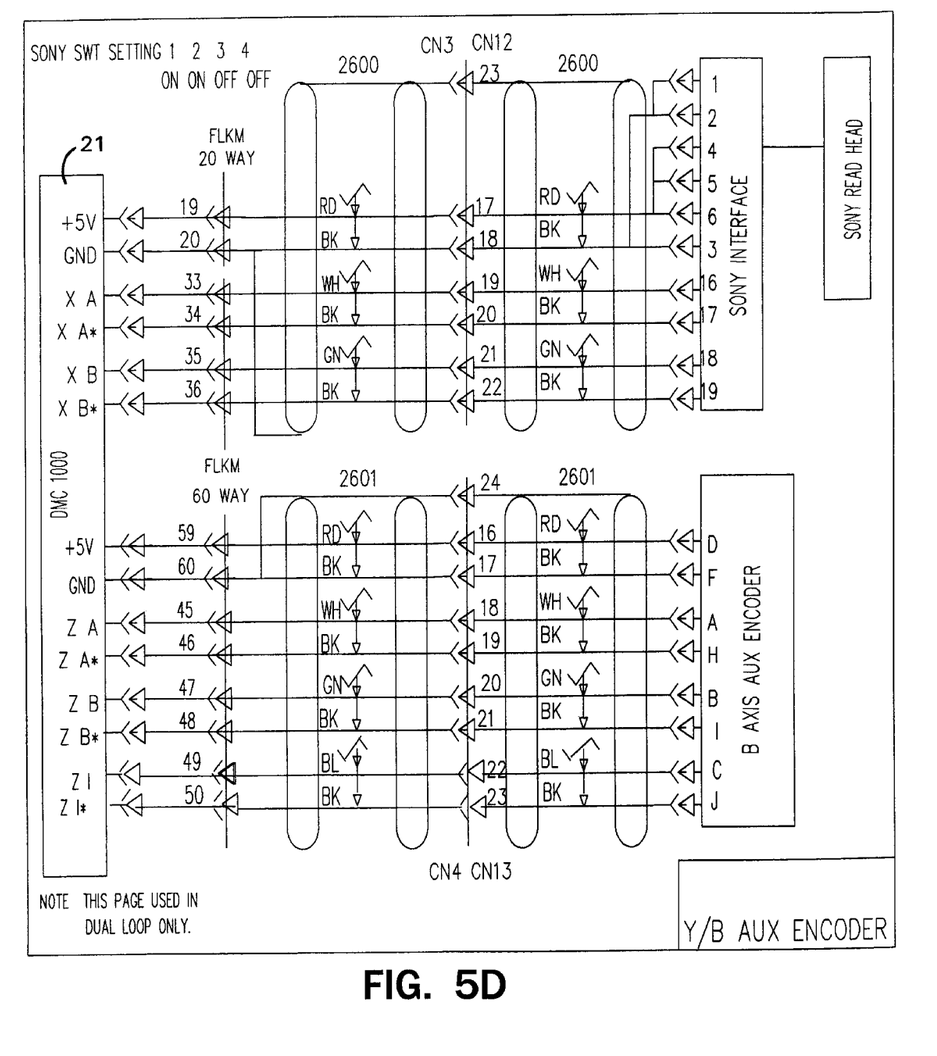
Figure 5E:
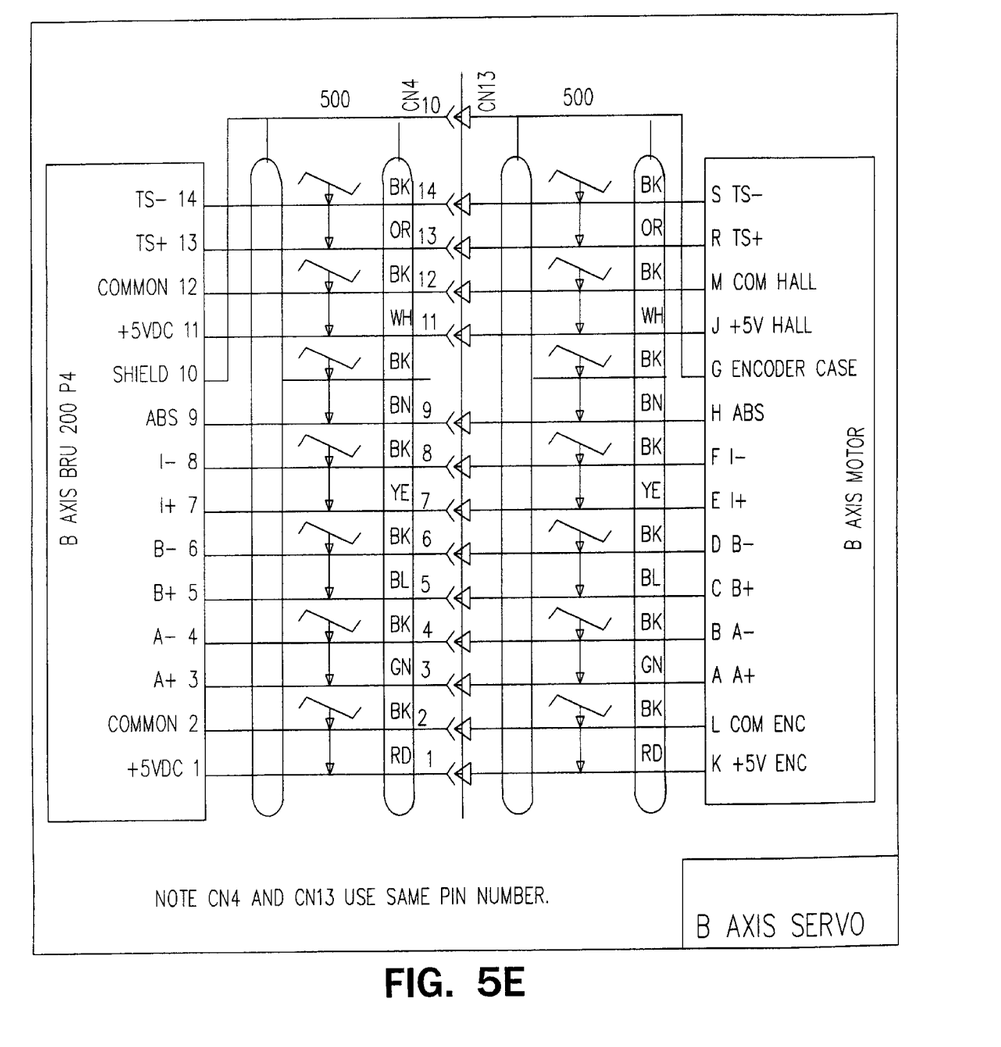
Figure 5F:
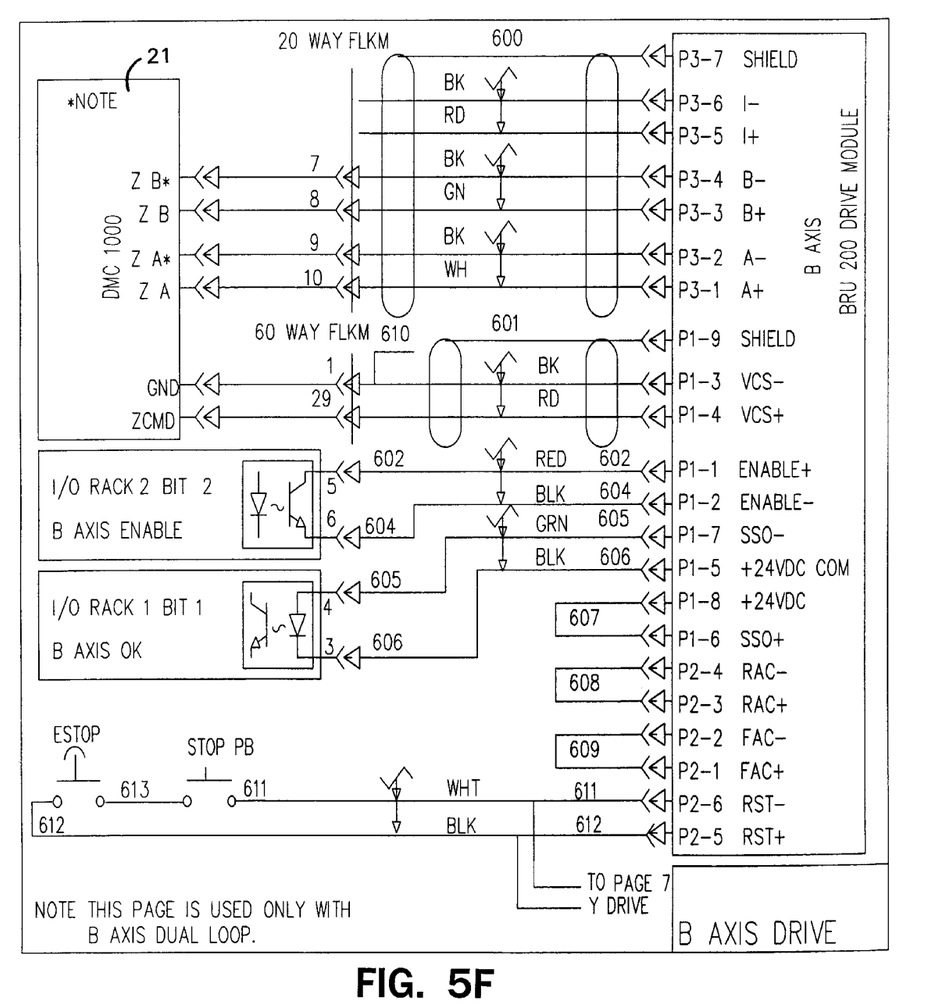
Figure 5G:
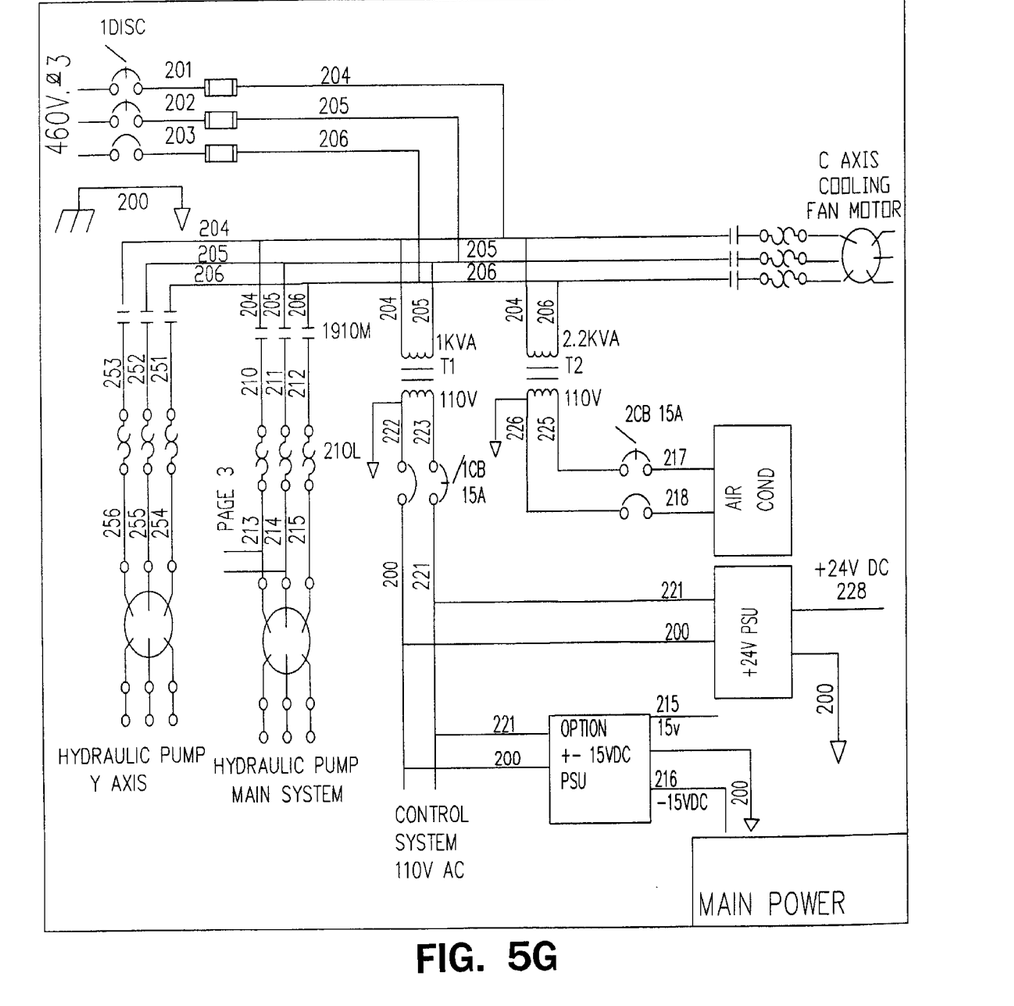
Figure 5H:
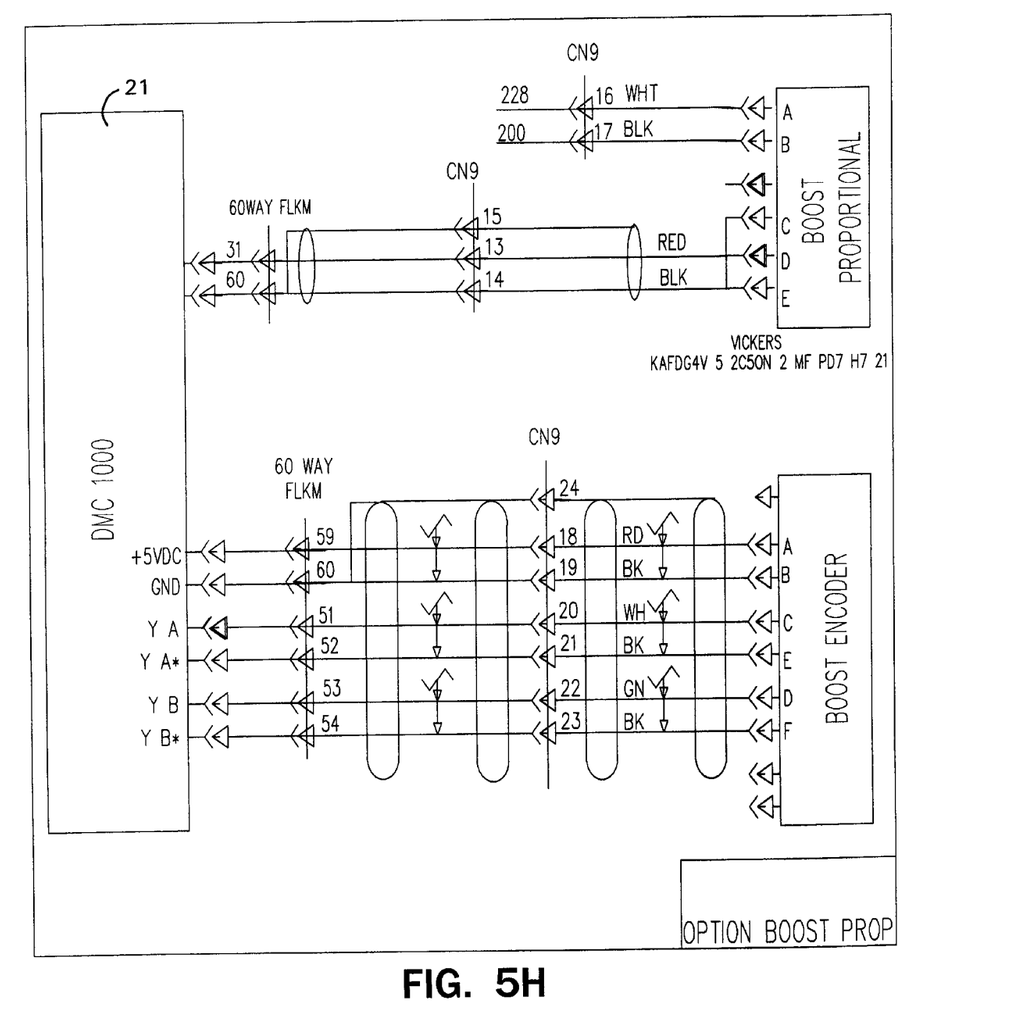
Figure 5I:
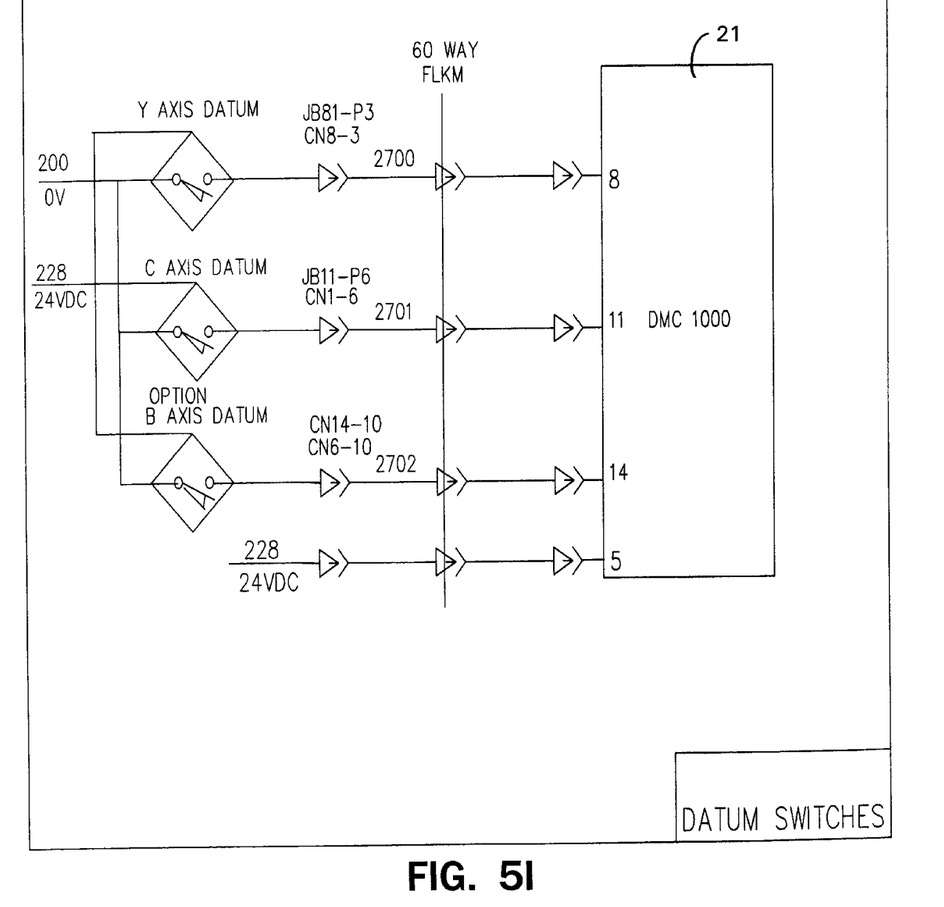
Figure 5J:
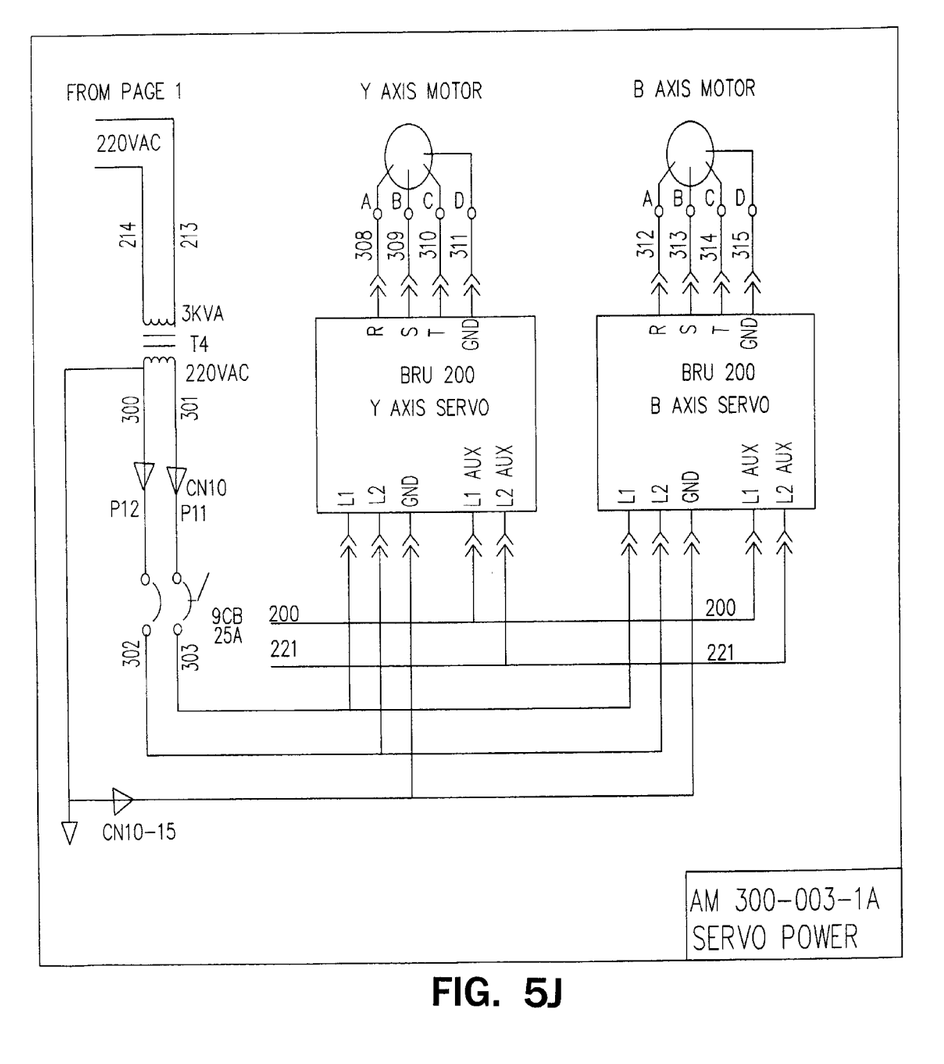
Figure 5K:
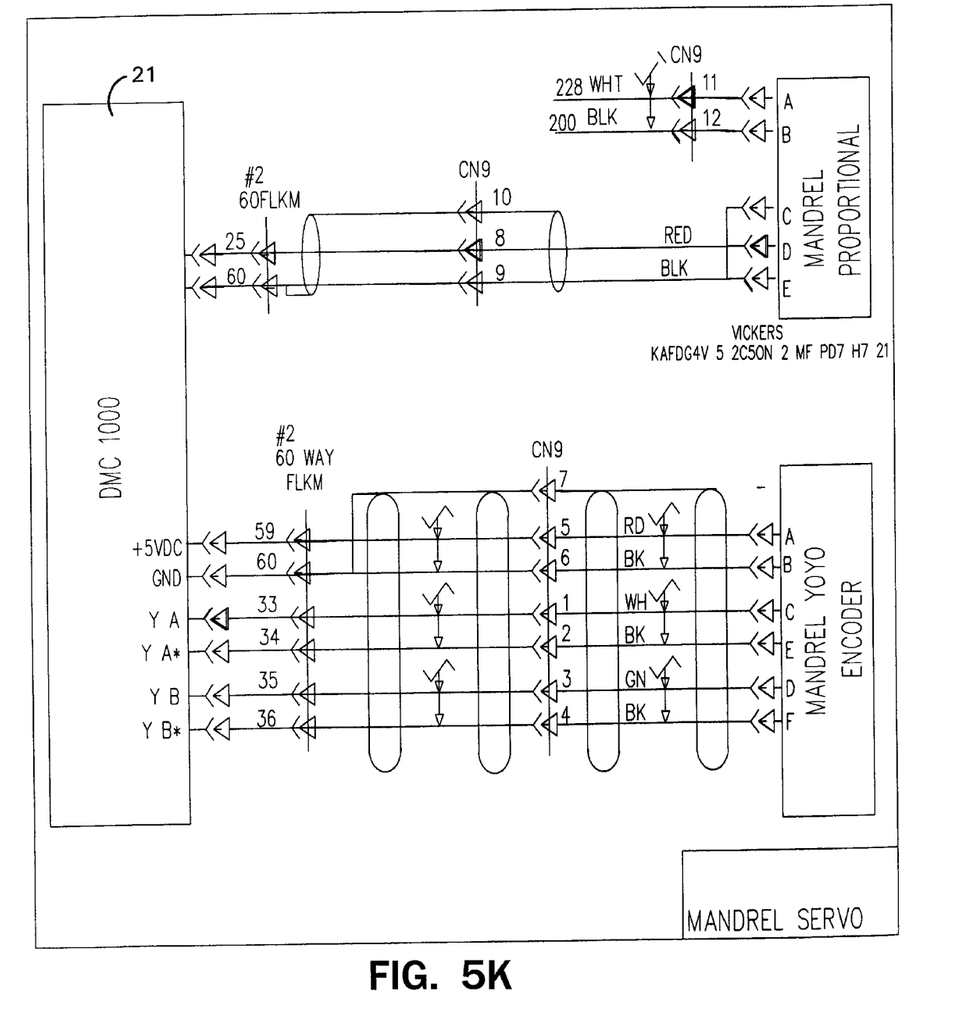

The present invention preferably but not necessarily includes a means for programmably controlling the tube bending operation. In a preferred embodiment of the present invention, the control means comprises computing means 20, controller unit 21, driving member 22 and encoder 23, as shown in FIG. 4.

Controller unit 21 is preferably a motion controller that is electrically communicative to computing means 20. In a preferred embodiment of the present invention, controller unit 21 comprises a conventional motion controller.

Controller unit 21 operates user-supplied instructions (stored in memory of computing means 20) and generates signals to motor 5, the tubular member feeding means, and the tubular member rotating means so as to coordinate the necessary motion of each in performing a tube bending operation. Controller unit 21 is preferably capable of generating a plurality of modes of motion to motor 5, the tubular member feeding means, and the tubular member rotating means, including jogging, point-to-point positioning, linear and circular interpolation and paths which are user-defined. In a preferred embodiment of the present invention, motor 5 is operated as a servo motor.

In a preferred embodiment of the present invention, computing means 20 comprises a personal computer, with controller unit 21 preferably connecting to the PC bus thereof. A software program, written in a software language which controller unit 21 is capable of interpreting so as to describe the action which the apparatus must take in performing the desired tube bending operation, is preferably stored in memory of computing means 20. When the software program is operated, the commands are transferred to controller unit 21 for execution.

Controller unit 21 preferably but not necessarily utilizes feedback from the bend arm rotating means, the tubular member feeding means and the tubular member rotating means so as to provide a closed loop system for efficiently controlling the motion thereof. As shown in FIG. 4, encoder 23, which is connected to motor 5, generates feedback signals that indicate the position thereof. The encoded signals are then used as input signals to controller unit 21 so that the desired motion signals may be generated thereby based upon the current position of motor 5 and the desired position as indicated in the user-supplied software program.

The present invention preferably but not necessarily includes means for substantially continuously eliminating backlash of bend arm 4. The backlash eliminating means preferably but not necessarily comprises a second encoder 23A (FIG. 4) which is connected to bend arm 4 so as to generate a feedback signal which indicates the position thereof. By creating a dual loop feedback system, controller unit 21 preferably but not necessarily substantially utilizes feedback signals from encoder 23 for stabilizing bend arm 4 and utilizes feedback signals from encoder 23A for accurately positioning bend arm 4. As a result, the present invention substantially compensates for backlash or other effects pertaining to bend arm 4 which may occur due to prolonged use.

Similarly, controller unit 21 preferably accepts feedback from motive components of the tubular member feeding means and the tubular member rotating means so as to provide a closed loop circuit for efficiently controlling the operation thereof. As shown in FIG. 4, encoders 24 and 25 are connected to the tubular member feeding means and the tubular member rotating means, respectively, so as to provide feedback to controller unit 21. In addition, the tubular member feeding means and/or the tubular member rotating means may utilize a dual loop feedback system by including additional encoders 24A and 25A which generate feedback signals based upon the location and orientation of tubular member T, respectively. As a result, the dual loop circuitry substantially compensates for backlash or other effects which may be associated with the tubular member feeding means and the tubular member rotating means due to prolonged use.

Referring to FIG. 5, there is shown a circuit diagram of a portion of the present invention, showing connections between the components thereof. Specifically, FIGS. 5A and 5B describe the circuitry for providing feedback from bend arm 4 and motor 5 to controller unit 21; FIGS. 5C and 5D describe circuitry for providing feedback from the tubular member feeding means to controller unit 21; and FIGS. 5D, 5E and 5F disclose circuitry for providing feedback from the tubular member rotating means to controller unit 21.

The present invention, and particularly the use of vector motor 5 and gearing 6, may be incorporated or retrofitted into existing tube bending machines so as to achieve the significant improvements indicated above.

In use, the user provides the software program to computing means 20. The tubular member feeding means and the tubular member rotating means move and orient tubular member T along the device so that a portion thereof is substantially adjacent head member 3. Next, bend arm member 4 is pivoted about axis P by motor 5 and gearing 6 so as to contact tubular member T substantially adjacent head member 3, thereby causing bending of tubular member T. Head member 3 substantially prevents lateral movement of the first portion of tubular member T. Upon bending tubular member T to the extent desired, bend arm 4 is returned to its original position. Thereafter, the tubular member rotating means and the tubular member feeding means repositions and reorients tubular member T relative to head member 3 and bend arm 4 for bending a second, subsequent portion of tubular member T. Feedback from motor 5 and bend arm 4 act to substantially eliminate backlash of bend arm 4.

I claim:

1. A tube bending apparatus, comprising:

means for moving the tube;

a first head member;

means for moving the tube along its longitudinal axis so that a portion of said tube is adjacent said first head member;

means for rotating said tube about its longitudinal axis;

a bend arm member which is pivotally connected to said first head member;

means for rotating said bend arm member;

wherein said bend arm rotating means consist of an electric motor and gearing which directly couples said bend electric motor to said bend arm member; and means for controlling said tube moving means, said tube rotating means and said bend arm rotating means based upon user-supplied data.

2. An apparatus as recited in claim 1, wherein:

said electric motor is a vector driven motor.

3. An apparatus as recited in claim 1, wherein:

said controlling means includes a motion controller unit for coordinating operation between said tube moving means, said tube rotating means and said bend arm rotating means; and means for substantially eliminating backlash on said bend arm member, comprising a dual closed loop circuit between said motion controller unit, said electric motor and said bend arm member.

4. An apparatus as recited in claim 3, wherein:

said closed loop circuit comprises a first means for sensing a position of said motor and generating an electrical signal for transmission to said motion controller unit, and second means for sensing a position of said bend arm member and generating an electrical signal for transmission to said motion controller unit.

5. An apparatus as recited in claim 3, wherein:

said controlling means includes a computing means for operating the user-supplied data and having computer memory, and wherein the user-supplied data is stored in said computer memory.

6. A tube bending device, comprising:

means for stably position a tube;

means for translating the tube along its longitudinal axis;

means for rotating the tube about its longitudinal axis;

means for preventing a first portion of the tube from substantially moving laterally;

means for applying a substantially lateral force to a second portion of the tube, said second portion being substantially adjacent said first portion of the tube;

means for programmably controlling said translating means, said tube rotating means and said force applying means; and wherein said force applying means consists of a bend arm member, an electric and gearing, said electric motor being directly coupled to said bend arm member.

7. A device as recited in claim 6, wherein:

said bend arm member is pivotally connected to said lateral movement preventing means.

8. A device as recited in claim 6, wherein:

said programmable control means comprises a motion controller unit;

means for substantially eliminating backlash of said bend arm member; and said backlash eliminating means comprises a first encoder unit electrically connected to said electric motor so as to sense a position thereof, a second encoder unit electrically connected to said bend arm member so as to sense a position thereof, and wherein said first and said second encoder units each generates electrical signals for said motion controller unit.

9. An apparatus for bending a tubular member, comprising:

means for holding a tubular member in a stable position;

means for supporting a first portion of the tubular member so as to substantially prevent lateral movement thereof;

a bending arm member pivotally connected to said supporting means;

means for rotating said bending arm member so as to substantially bend a second portion of the tubular member substantially adjacent said first portion thereof;

means for programmably controlling said bending arm rotating means; and wherein said bending arm rotating means consists of an electric motor and gear members connected to said motor and said bend arm member, said electric motor being directly coupled to said bend arm member.

10. An apparatus as recited in claim 9, wherein:

said controlling means comprises a motion controller unit;

said apparatus further includes a means for substantially eliminating backlash of said bend arm member; and said backslash eliminating means comprises a dual loop feedback circuit having means for sensing a position of said motor and for sensing a position of said bend arm member.

* * * * *